(12) United States Patent
Vitale et al.

(10) Patent No.: US 7,899,597 B2
(45) Date of Patent: Mar. 1, 2011

(54) WORK MACHINE WITH OPERATOR PRESENCE DETECTION STRATEGY

(75) Inventors: Andrew J. Vitale, Peoria, IL (US); Brian G. Funke, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 1174 days.

(21) Appl. No.: 11/361,377

(22) Filed: Feb. 24, 2006

(65) Prior Publication Data
US 2007/0203630 A1   Aug. 30, 2007

(51) Int. Cl.
*G06F 3/00* (2006.01)

(52) U.S. Cl. .................. 701/50; 701/36; 701/45; 180/272; 180/273; 477/20

(58) Field of Classification Search .................. 701/36, 701/45, 50; 180/272–273; 477/20
See application file for complete search history.

(56) References Cited

U.S. PATENT DOCUMENTS

| | | | |
|---|---|---|---|
| 5,048,273 A | 9/1991 | Orsborn et al. | |
| 5,219,413 A | 6/1993 | Lineberger | |
| 5,425,431 A * | 6/1995 | Brandt et al. | 180/273 |
| 5,711,391 A | 1/1998 | Brandt et al. | |
| 5,928,110 A | 7/1999 | Vornehm et al. | |
| 6,135,230 A | 10/2000 | Schenck et al. | |
| 6,186,260 B1 | 2/2001 | Schenck et al. | |
| 6,226,902 B1 | 5/2001 | Heyne | |
| 6,501,281 B1 | 12/2002 | Rundo | |
| 6,577,909 B1 * | 6/2003 | McGowan et al. | 700/79 |
| 6,647,332 B1 | 11/2003 | Esterby et al. | |
| 6,856,873 B2 * | 2/2005 | Breed et al. | 701/45 |
| 6,948,398 B2 | 9/2005 | Dybro | |
| 7,159,684 B2 * | 1/2007 | Dahl et al. | 180/271 |
| 7,283,903 B2 * | 10/2007 | Merten et al. | 701/50 |

FOREIGN PATENT DOCUMENTS

| | | |
|---|---|---|
| EP | 0814207 | 12/1997 |
| JP | 7-246861 | 9/1995 |

OTHER PUBLICATIONS

NPL, Integrated Publishing, http://www.tpub.com/content/constructionforklifts/TM-10-3930-644-14-P/TM-10-3930-644-14-P0095.htm.*

* cited by examiner

*Primary Examiner*—Khoi Tran
*Assistant Examiner*—Nikhil Sriraman
(74) *Attorney, Agent, or Firm*—Liell & McNeil

(57) ABSTRACT

A work machine uses an operator presence detection strategy to enable or disable the work machine. A plurality of sensors provide independent indications of operator presence. These sensors may include a seat sensor, an inching pedal sensor, a transmission output speed sensor and a conveyance gear sensor. The work machine is enabled if at least one sensor indicates the presence of an operator; however, the work machine is disabled if none of the sensors indicate an operator.

14 Claims, 2 Drawing Sheets

WORK MACHINE WITH OPERATOR PRESENCE DETECTION STRATEGY

TECHNICAL FIELD

The present disclosure relates generally to enabling and disabling a work machine based upon sensing the presence, of an operator, and more particularly to an operator presence detection strategy that evaluates a plurality of independent indicators of operator presence in determining whether to enable or disable the work machine.

BACKGROUND

Work machines are generally provided with an operator station that has a seat located for good visibility of the area around the work machine while maintaining easy access to work machine and implement controls, such as joy sticks, steering wheels, buttons and the like. Arm rests and seat switches are commonly used as operational state sensors for work machines such as lawn tractors, skid steer loaders, integrated tool carriers, material handling machines, backhoe loaders and the like. As such, these switches are typically used to sense and detect when the machine operator is properly located in the machine prior to allowing movement thereof, and/or enabling or disabling various implement systems associated with the work machine. A typical switch/sensor arrangement of this type is disclosed, for instance, in U.S. Pat. No. 5,711,391. In other work machines, such as those associated with the agricultural industry, there is recognition that the operator may sometimes stand up in the operator station in order to get better visibility while traversing over ground being worked. U.S. Pat. No. 5,048,273 teaches an operator presence circuitry for a cotton harvester that maintains enablement of the work machine when a seat switch is open, such as when an operator is standing, if the transmission is in a drive mode, such as being out of a neutral gear.

Although these operator presence strategies can often times avoid annoying interruptions by misdetecting the absence of an operator, different work machines include different modes of operation requiring ever more sophisticated means of detecting an operator presence. If a work machine is being properly operated, but an interlock control system disables the work machine despite the presence of an operator, costly and annoying delays can occur. For instance, some work machines, such as motor graders, have an operation mode where the operator is present, but standing, while the transmission has zero output speed and is in a neutral gear. Such a condition may exist, for instance, when the operator is utilizing an inching pedal to smooth transition into a motion mode during precision grading operations.

The present disclosure is directed to one or more of the problems set forth above.

SUMMARY OF THE DISCLOSURE

In one aspect, a method of operating a work machine includes sensing indicators of operator presence in the work machine which includes sensing a seat sensor, a transmission output speed sensor and a conveyance gear sensor. The work machine is enabled if at least one of the indicators indicates that an operator is present in the work machine. However, the work machine is disabled if none of the indicators indicates that an operator is present in the work machine.

In another aspect, a work machine includes a work machine body with an operator station. An electronic controller is connected to the work machine body. A transmission output speed sensor, a conveyance gear sensor and a seat sensor are all in communication with the electronic controller. At least one implement is also in communication with the electronic controller. The electronic controller includes an operator presence algorithm operable to enable the work machine based on any one of a seat sensor indication, a transmission output speed sensor indication and a conveyance gear sensor indication. However, the operator presence algorithm is operable to disable the work machine based upon a combination of all of the seat sensor indication, the transmission output speed sensor indication and the conveyance gear sensor indication.

DETAILED DESCRIPTION

Figure 1:
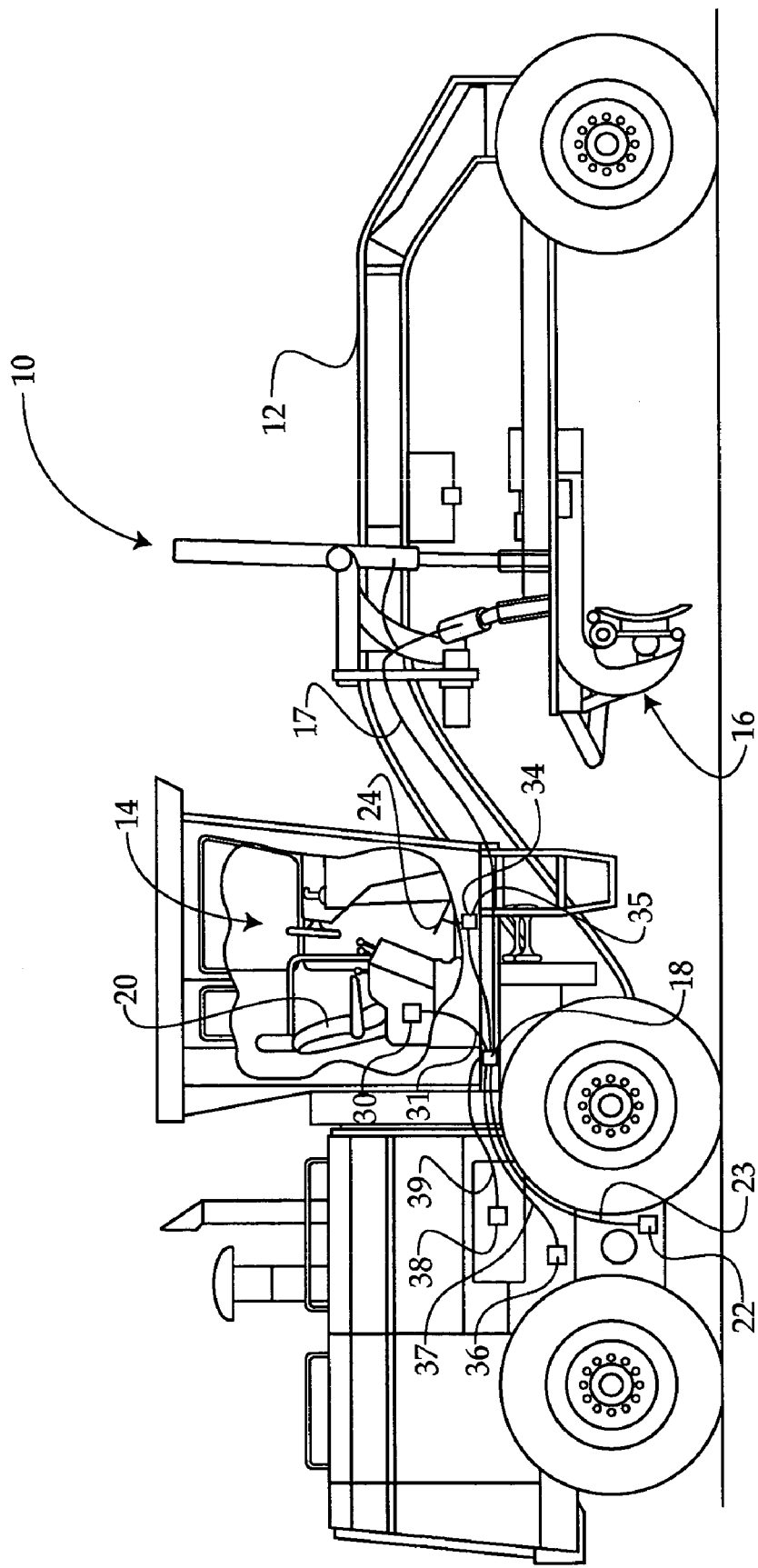
FIG. 1 is a side schematic elevational view of a work machine according to one aspect of the present disclosure.

Referring to FIG. 1, a work machine 10, which is illustrated as a motor grader, includes a work machine body 12, an operator station 14 and an implement 16, which is illustrated as a grader blade. Like many modern day work machines, motor grader 10 is electronically controlled such that operator commands are interpreted by one or more electronic controllers 18, which then communicate with various controlled subsystems of the work machine. Nevertheless, the present disclosure finds potential application in work machines with lessor levels of electronic control, and possibly no electronic control where operator commands are supplied directly to actuators via known hydraulic and/or mechanical linkages. Thus, those skilled in the art will appreciate that the concepts taught in the present disclosure can be implemented via software in an electronic controller as illustrated, in electronic circuitry for work machines with partial electronic control, via mechanical and/or hydraulic devices that employ the operator presence detection logic of the present disclosure, or any combination of these software/hardware means.

Motor grader 10 includes a seat 20 located in operator station 14 and a seat sensor 30 that communicates with electronic controller 18 via communication line 31. Thus, if an operator of sufficient weight is seated in seat 20, and "operator-present" signal is supplied to electronic controller 18. On the other hand, if the operator is standing or is of extremely slight mass sitting in seat 20, the seat sensor 20 will register and "operator-not-present" signal, and communicate the same to electronic controller 18 via communication line 31. An inching pedal 24 is also located in operator station 14, and its position is sensed by an inching pedal sensor 34 that communicates with electronic controller 18 via communication line 35. Thus, inching pedal sensor 34 can be any conventional sensor, such as one that may sense a percentage of inching pedal depression, and relay that information to electronic controller 18 via communication line 35. On the other hand, inching pedal sensor 34 could be a less sophisticated alternative that simply provides one bit of information if the pedal is depressed beyond some threshold percentage. A variety of work machine and implement controls that are not numbered but also located in operator station 14 and communicate with electronic controller 18 via communication lines (not shown) in a conventional manner. Those control inputs are interpreted by the electronic controller 18 and transmitted to various conveyance and implement actuators to control locomotion and/or implement operation, such as adjustment of grader blade 16 position, in a manner well known in the art. For instance, an appropriate command from operator station 14 will be sent to electronic controller 18 and transmitted to various actuators associated with greater blade 16 via communication line 17 to perform some adjustment corresponding to the operator command. In addition, electronic controller 18 can also command actuation of parking brake 22 via an appropriate signal communicated via communication line 23 in a manner well known in the art.

Motor grader 10 also includes a transmission output speed sensor 36 that transmits a signal indicative of transmission output speed to electronic controller 18 via communication line 37. In addition, motor grader 10 includes a conveyance gear sensor 38 that communicates the current gear to electronic controller 18 via communication line 39.

Electronic controller 18 preferably includes an operator presence algorithm that enables the work machine if at least one of a plurality of indicators indicates that an operator is present in the operator station 14 of the work machine. On the other hand, the operator presence algorithm is preferably operable to disable the work machine if all of the indicators indicate that the operator is not present in the operator station 14 of the work machine. In the present disclosure, these operator indication sensors include the seat sensor 30, the inching pedal sensor 34, the transmission output speed sensor 22 and the conveyance gear sensor 36. As used in this disclosure, the work machine is enabled if it can move about under its own power in a manner controlled from the operator station 14, and can utilize its one or more implements at least partially or fully to perform some work task. The work machine is considered disabled in the context of the present disclosure if it is rendered unable to move and/or if its implement(s) are locked out of motion or action from commands generated in the operator station 14.

INDUSTRIAL APPLICABILITY

The present disclosure finds application generally to any work machine, especially those that have a variety of different accepted modes of operation. The disclosure is described specifically in the context of a motor grader, but could be applicable to other work machines, including agricultural machinery, that have various modes of operation in which an operator may assume different locations or stances in an operator station. Thus, the present disclosure could be implemented in a work machine by first identifying each of its different modes of operation, and what control inputs are likely being sent to a controller from an operator station in a minimal control input aspect of that individual mode.

In the case of a motor grader, the operator can be in a conventional driving mode and seated in seat 20 so that seat sensor 30 communicates an "operator-present" signal to electronic controller 18, which enables the work machine, or continues enablement of the work machine if already enabled. In addition, the operator's presence would be indicated in such an instance by the transmission output speed sensor not being zero and/or the conveyance gear indicating a gear other than neutral. It is also possible for the operators presence to be indicated when the operator is standing and the transmission output speed is non-zero even though the conveyance gear is in neutral. In still another potential mode of operation, the machine is not moving and the operator is standing in preparation in smooth transition to motion by depressing the inching pedal 24. In such an instance, the inching pedal would put the conveyance gear in neutral, the machine would not be moving so that the transmission output speed would be zero and the operator is standing so that the seat sensor 30 does not detect any presence. However, the operators presence is indicated since inching pedal sensor 34 senses depression of the inching pedal 24 and transmits that information to electronic controller 18 via communication line 35, thus maintaining the enablement of work machine 10.

Figure 2:
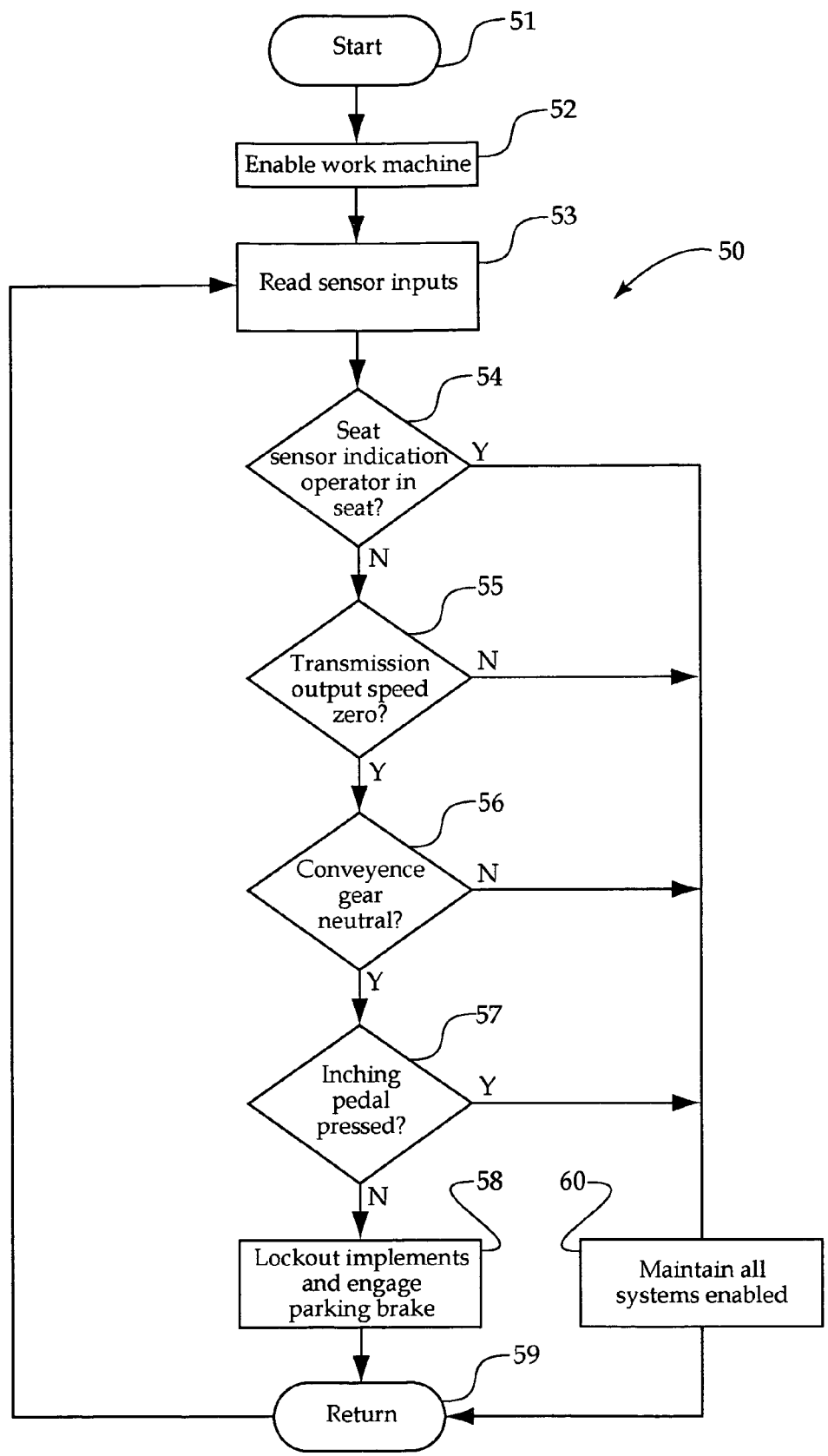
FIG. 2 is a software flow diagram of an operator presence algorithm according to the present disclosure.

Referring now to FIG. 2 an example software flow diagram for an operator presence algorithm 50 is illustrated. At oval 51, the logic starts. At box 52, the work machine is enabled. This reflects one aspect of the present disclosure where operator presence is presumed or is the default, unless a combination of all operator presence indicators indicate that the operator is not present. At box 53, the sensor inputs are read. In other words, the electronic controller 18 reads a seat sensor indication, an inching pedal indication, a transmission output speed sensor indication and a conveyance gear sensor indication. At resolver 54, the logic determines whether the seat sensor indicates an "operator-present" signal. If so, the logic advances to box 60 that maintains all systems enabled, or otherwise enables the work machine. At oval 59, the logic loops back to again read the sensor inputs at box 53. If the seat sensor indication is negative, indicating an operator not in the seat 20, the next resolver determines whether transmission output speed is zero. If transmission output speed is not zero, the logic again advances to box 60 to maintain or enable the work machine and then loops back to again read the sensors at box 53. If the transmission output speed is zero, the logic determines whether the conveyance gear is in neutral. If not, again there is an indication that an operator is present and the work machine is enabled. If the conveyance gear is neutral, then the logic proceeds to resolve 57 where it is determined whether the inching pedal is depressed. For instance, it might be desirable to determine whether the inching pedal is depressed beyond some predetermined percentage, such as 90°. If so, that logic again advances to box 60 where the work machine is enabled, or its already enabled condition is maintained. The logic then loops back via return oval 59 to box 53 to again read the sensor inputs. If the combination of all of the four sensor indications indicated that an operator is not present, the logic will proceed to box 58 where the work machine will be disabled. In the specific embodiment, the implement grader 16, controls will be locked out from the operator station, and the parking brake 22 will be engaged with an appropriate signal communicated from electronic controller 18 via communication line 23. The logic again will then loop back and again read the sensor inputs, if at least one of the sensor inputs then indicates that an operator is present, the system will be re-enabled.

Those skilled in the art will appreciate that the present disclosure has the ability to detect when an operator is most likely in the operator station 14 without causing undesirable interruptions in operation because the operator is adjusting his seat position, is travelling over bumby conditions, the machine is moving and the operator is standing, or any other of various situations where an operator is still present and disablement of the work machine is not desirable.

In the unlikely event that the seat switch 30 should fail, the electronic controller may include back up logic where the operator in seat switch status is determined from communication between an implement controller and the operator station 14 and the electronic controller 18. The present disclosure also contemplates partial enablement in situations, such as that described when the seat detection sensor 30 fails. For instance, if the seat sensor 30 fails, and the data link status of communication between an implement controller in the operator station 14 and the electronic controller 18 is not valid, the electronic controller 18 may reset the status of the work machine to be disabled when all of the other not present conditions are met, as previously described.

It should be understood that the above description is intended for illustrative purposes only, and is not intended to limit the scope of the present invention in any way. Thus, those skilled in the art will appreciate that other aspects, objects, and advantages of the invention can be obtained from a study of the drawings, the disclosure and the appended claims.

What is claimed is:

1. A method of operating a machine, comprising the steps of:
   sensing indicators of operator presence in the machine, which includes sensing a seat sensor, a transmission output speed sensor and a conveyance gear sensor;
   the sensing step also includes sensing depression of an inching pedal when an operator is standing, a conveyance gear is in neutral, a transmission output speed is zero, and the machine is not moving;
   enabling the machine if at least one of the indicators indicates that an operator is present in the machine; and
   disabling the machine if none of the indicators indicates that an operator is present in the machine.

2. The method of claim 1 including the steps of:
   indicating the presence of an operator if a sensed transmission output speed is non-zero;
   indicating the presence of an operator if a sensed conveyance gear is not neutral;
   indicating the presence of an operator if the seat sensor is in an operator-in-seat position; and
   indicating the presence of an operator if a sensed inching pedal position is greater than a predetermined threshold.

3. The method of claim 2 wherein the predetermined threshold is a ninety percent position.

4. The method of claim 3 wherein the disabling step includes the steps of:
   locking out machine implements; and
   engaging a parking brake of the machine.

5. The method of claim 4 wherein the machine implements includes a grader.

6. A machine comprising:
   a machine body that includes an operator station;
   an electronic controller connected to the machine body;
   a transmission output speed sensor in communication with the electronic controller;
   a conveyance gear sensor in communication with the electronic controller;
   a seat sensor in communication with the electronic controller; the electronic controller includes an operator presence algorithm operable to enable the machine based on any one of a seat sensor indication, a transmission output speed sensor indication, and a conveyance gear sensor indication, and being operable to disable the machine based on a combination of all of the seat sensor indication, the transmission output speed sensor indication and the conveyance gear sensor indication; and
   the operator presence algorithm being operable to enable the machine based upon an inching pedal mode of operation when the machine is not moving, an operator is standing, a conveyance gear is in neutral and a transmission speed is zero.

7. The machine of claim 6 including an inching pedal sensor in communication with the electronic controller; and
   the operator presence algorithm is also operable to enable the machine based on an inching pedal sensor indication alone, and being operable to disable the machine based on the inching pedal sensor indication in combination with the seat sensor indication, the transmission output speed sensor indication and the conveyance gear sensor indication.

8. The machine of claim 7 wherein the machine body is a motor grader body; and
   the at least one implement includes a grader.

9. The machine of claim 8 including a parking brake in communication with the electronic controller;
   the operator presence algorithm is operable to engage the parking brake as part of disabling the machine.

10. The machine of claim 9 wherein the operator presence algorithm is operable to enable the machine if the seat sensor indication is operator-in-seat, or if the transmission output speed sensor indication is non-zero, or if the conveyance gear sensor indication is not neutral, or if the inching pedal sensor indication is pressed; and
    the operator presence sensor algorithm is operable to disable the machine if the seat sensor indication is operator-not-in-seat, and the transmission output speed sensor indication is zero, and the conveyance gear sensor indication is neutral, and the inching pedal sensor indication is not-pressed.

11. An electronic controller for a machine comprising:
    an operator presence algorithm operable to enable control communication between a machine implement and an operator control if at least one of a plurality of sensors has an indication that satisfies a respective predetermined criterion, and being operable to disable control communication between the machine implement and the operator control if a combination of all of the plurality of sensors have indications that fail to satisfy the respective predetermined criteria; and
    the operator presence algorithm also being operable to enable the machine based upon an inching pedal mode of operation when the machine is not moving, an operator is standing, a conveyance gear is in neutral and a transmission speed is zero.

12. The electronic controller of claim 11 includes means for receiving the plurality of sensor indications, which include a seat sensor indication, a transmission output speed sensor indication and a conveyance gear sensor indication.

13. The electronic controller of claim 12 wherein the plurality of sensor indications includes an inching pedal sensor indication.

14. The electronic controller of claim 12 wherein the operator presence algorithm is operable to engage a parking brake if the combination of all of the plurality of sensors have indications that fail to satisfy the respective predetermined criteria.

* * * * *